(12) United States Patent
Tomioka (10) Patent No.: US 11,897,050 B1
(45) Date of Patent: Feb. 13, 2024

(54) METHOD FOR JOINING DISSIMILAR METALS, JOINED BODY, AND JOINING APPARATUS

(71) Applicant: KABUSHIKI KAISHA TOSHIBA, Tokyo (JP)

(72) Inventor: Taizo Tomioka, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 17/971,512

(22) Filed: Oct. 21, 2022

(30) Foreign Application Priority Data

Dec. 16, 2021 (JP) ................................. 2021-203965

(51) Int. Cl.
*B23K 20/00* (2006.01)
*B23K 20/12* (2006.01)
(Continued)

(52) U.S. Cl.
CPC ........ *B23K 20/125* (2013.01); *B23K 2103/04* (2018.08); *B23K 2103/10* (2018.08);
(Continued)

(58) Field of Classification Search
CPC .............. B23K 20/122; B23K 20/1255; B23K 20/1265; B23K 2103/10; B23K 2101/14;
(Continued)

(56) References Cited

U.S. PATENT DOCUMENTS 11,185,945 B2 * 11/2021 Hori ................... B23K 20/1265
11,185,946 B2 * 11/2021 Hori ..................... B23K 20/122
(Continued)

FOREIGN PATENT DOCUMENTS

DE    10 2016 119 062 A1    10/2017
JP         2004-66331 A      3/2004
(Continued)

OTHER PUBLICATIONS

H. Okamurai, et al., "Friction Diffusion Welding of Dissimilar Material with Friction Stir Method (No. 1)," Japan Welding Society, pp. 442-443 (2002), and partial translation, 1 page.
(Continued)

*Primary Examiner* — Erin B Saad
(74) *Attorney, Agent, or Firm* — Finnegan, Henderson, Farabow, Garrett & Dunner, LLP (57) ABSTRACT

A method for joining dissimilar metals according to the embodiment is a method for butt-joining, using frictional heat, a first member having a plate shape and containing first metal and a second member having a plate shape and containing second metal having a melting point higher than that of the first metal. The method for joining dissimilar metals includes: overlapping an end portion of the second member on an end portion of the first member; and pressurizing the second member toward the first member by bringing a rotating joining tool having a protruding portion at a tip end into contact with an overlapping portion of the second member with the first member. When the second member is pressurized toward the first member, the tip end of the rotating joining tool is not in contact with the first member.

16 Claims, 4 Drawing Sheets

(51) Int. Cl.
   *B23K 103/04* (2006.01)
   *B23K 103/20* (2006.01)
   *B23K 103/12* (2006.01)
   *B23K 103/08* (2006.01)
   *B23K 103/10* (2006.01)

(52) U.S. Cl.
   CPC ...... *B23K 2103/12* (2018.08); *B23K 2103/15* (2018.08); *B23K 2103/20* (2018.08)

(58) Field of Classification Search
   CPC . B23K 20/129; B23K 20/1225; B23K 20/124
   See application file for complete search history.

(56) References Cited

U.S. PATENT DOCUMENTS

| | | | |
|---|---|---|---|
| 11,311,963 B2* | 4/2022 | Hori | B23K 20/1265 |
| 2003/0075584 A1 | 4/2003 | Sarik et al. | |
| 2004/0159696 A1* | 8/2004 | Mahoney | B23K 20/1275 228/2.1 |
| 2006/0283918 A1* | 12/2006 | London | B23K 20/10 228/112.1 |
| 2008/0251571 A1 | 10/2008 | Burford | |
| 2009/0072007 A1* | 3/2009 | Nagano | B23K 20/1255 228/2.1 |
| 2010/0089977 A1* | 4/2010 | Chen | B23K 20/2333 228/114.5 |
| 2010/0096438 A1* | 4/2010 | Sato | B23K 20/122 228/114 |
| 2011/0135954 A1* | 6/2011 | Nakagawa | B29C 66/114 428/615 |
| 2011/0214799 A1* | 9/2011 | Szymanski | B23K 20/128 156/73.5 |
| 2012/0052322 A1 | 3/2012 | Hatakeyama et al. | |
| 2012/0292080 A1 | 11/2012 | Kahl | |
| 2015/0115019 A1 | 4/2015 | Pascal et al. | |
| 2015/0273637 A1 | 10/2015 | Hori et al. | |
| 2020/0164461 A1* | 5/2020 | Hiro | B23K 20/1265 |
| 2020/0254556 A1* | 8/2020 | Hori | B23K 20/1255 |
| 2020/0282489 A1* | 9/2020 | Hori | B23K 20/1255 |
| 2020/0353558 A1* | 11/2020 | Hori | B23K 20/122 |
| 2021/0069838 A1* | 3/2021 | Ano | B23K 20/122 |
| 2021/0146472 A1* | 5/2021 | Hori | B23K 20/1265 |
| 2021/0146474 A1* | 5/2021 | Hori | B23K 20/1265 |
| 2021/0205918 A1* | 7/2021 | Fujii | B23K 20/227 |

FOREIGN PATENT DOCUMENTS

| | | |
|---|---|---|
| JP | 2012-50996 A | 3/2012 |
| JP | 2013-514188 A | 4/2013 |
| JP | 2015-515927 A | 6/2015 |
| JP | 2016-163909 A | 9/2016 |
| JP | 6675554 B2 | 4/2020 |
| JP | 7035892 B2 | 3/2022 |
| JP | 2023-6931 A | 1/2023 |

OTHER PUBLICATIONS

N. Eslami, et al., "Dissimilar Friction Stir Butt Welding Aluminum and Copper with Cross-Section Adjustment for Current-Carrying Components," MDPI Metals, vol. 8, No. 661; doi:10.3390/met8090661, 11 pages (2018).

Y. Komatsu, et al., "Friction Stir Welding of dissimilar metals—Copper/Aluminum and Steel/Aluminum Butt Joints-," Nagano Prefecture General Industrial Technology Center, Report No. 2, pp. M21-M24 (2007).

T. Fuse, et al., "Properties of Copper-Aluminum Joints by Friction Stir Welding," Toshiba, 2 pages , and partial translation , 1 page.

Fuji Terminal Industry Co., Ltd., "Development of Friction Stir Welding Technology for Irregular Shapes and Dissimilar Metals Contributing to the Production of Aluminum/Copper Bimetallic Terminals," 19 pages, and partial translation, 2 pages.

W. Xie, et al., "Formulation of Intermetallic Phases on the Bond Interface of Aluminum-Clad Copper," J. of the Japan Inst. of Metal and Mat., vol. 75, No. 3, pp. 166-172 (2011), and partial translation, 2 pages.

* cited by examiner

METHOD FOR JOINING DISSIMILAR METALS, JOINED BODY, AND JOINING APPARATUS

CROSS-REFERENCE TO RELATED APPLICATIONS

This application is based upon and claims the benefit of priority from Japanese Patent Application No.2021-203965, filed on Dec. 16, 2021; the entire contents of which are incorporated herein by reference.

FIELD

Embodiments of the invention relate to a method for joining dissimilar metals, a joined body, and a joining apparatus.

BACKGROUND

In a manufacturing process of a component used in an automobile, a secondary battery module, or the like, plate-shaped members having a small thickness and made of materials with different melting points may be butt-joined to each other. Welding, brazing, and friction stir joining are known as methods for butt-joining such members. However, depending on a combination of metal compositions of the plate-shaped members, low-strength intermetallic compound layer or alloy layer may be thickly generated at a joining interface by welding or brazing, and a necessary joining strength may not be obtained.

On the other hand, in the friction stir joining which is solid-phase joining, a thickness of intermetallic compound layer generated at the joining interface can be reduced. As a friction stir joining method in which plate-shaped members having significantly different melting points are butt-joined to each other, a method is proposed in which a rotating joining tool is inserted into a member made of low-melting-point metal of two plate-shaped members to be joined, and a butt end face of the other plate-shaped member is cut and joined by a stirring pin of the joining tool (for example, see Literature 1-4 (Non-Patent), Patent Literature 5). However, in this method, small pieces of high-melting-point metal are dispersed in the low-melting-point metal, and the joining strength and electrical resistance of a joining portion may vary.

In addition, a method is proposed in which a stirring pin of a joining tool is inserted into a plate-shaped member made of low-melting-point metal, and the stirring pin is brought into close contact with a butt end face of a plate-shaped member made of high-melting-point metal by a distance of 0.1 mm to join the plate-shaped members. In this method, small pieces of the high-melting-point metal are not dispersed in the low-melting-point metal, and satisfactory joining can be obtained. However, a high-degree of flatness is required for the butt end face of the plate-shaped member made of the high-melting-point metal, and high accuracy is required for positioning of the stirring pin of the joining tool to the butt end face of the plate-shaped member. Therefore, the method may be difficult to be applied to thin-plate members (for example, see Literature 6 (Non-Patent)).

On the other hand, as a method for joining thin plates, a technique is proposed in which the vicinities of end faces of the thin plates are overlapped, and the overlapped portion is pressurized by a rotating joining tool to obtain a butt-joint (for example, see Patent Literature 7). In this method, when metals forming the thin plates to be joined are different from each other, end portions are overlapped in which a thin plate made of high-melting-point metal is located on a lower side and a thin plate made of low-melting-point metal is located on an upper side, and the end portion of the thin plate made of the low-melting-point metal is pressurized by the rotating joining tool. In such a manner, the thin plate made of the low-melting-point metal is softened and deformed by frictional heat generated between the joining tool and the thin plate made of the low-melting-point metal, and the thin plate made of the low-melting-point metal and the thin plate made of the high-melting-point metal to be joined to can be butt-joined.

However, although the thin plate made of the low-melting-point metal and the thin plate made of the high-melting-point metal are softened by the frictional heat, a deformation stress of the high-melting-point metal is larger than that of the low-melting-point metal at the same temperature. Therefore, it is difficult to sufficiently deform the high-melting-point metal even though the thin plate made of the high-melting-point metal is pressurized by the joining tool through the thin plate made of the low-melting-point metal. Therefore, in a joining portion, a part of a plate material made of the low-melting-point metal is thinly joined onto the vicinity of the end portion of the thin plate made of the high-melting-point metal. Therefore, even if such a technique is used, it is difficult to obtain a satisfactory butt-joined portion having a sufficient joining strength.

Also disclosed is a method of inserting the joining tool into the high-melting-point metal in butt-joining the high-melting-point metal to the low-melting-point metal using rotating the joining tool (for example, see Patent Literature 8).

However, this joining method has the following problems.

When the high-melting-point metal is copper and the low-melting-point metal is aluminum, the temperature at the butt-joint rises to the same level or higher than the melting point of aluminum. Therefore, the thickness of the Cu-Al intermetallic compound layer and the thickness of the eutectic alloy layer formed on the joint surface increase.

For this reason, the joining strength becomes low.

Therefore, it is desired to develop a technique capable of satisfactorily butt-joining thin plates made of metals having different melting points.

DETAILED DESCRIPTION

A method for joining dissimilar metals according to the embodiment is a method for butt-joining a first member having a plate shape and containing first metal and a second member having a plate shape and containing second metal having a melting point higher than that of the first metal using frictional heat. The method for joining dissimilar metals includes processes of: overlapping an end portion of the second member on an end portion of the first member; and pressurizing the second member toward the first member by bringing a rotating joining tool having a protruding portion at a tip end into contact with an overlapping portion of the second member with the first member. When the second member is pressurized toward the first member, the tip end of the rotating joining tool is not in contact with the first member.

The embodiment will be illustrated hereinafter with reference to the drawings. In the drawings, the same components are denoted by the same reference numerals, and detailed descriptions thereof will be omitted appropriately.

(Method for Joining Dissimilar Metals and Joined Body)

Figure 1A:
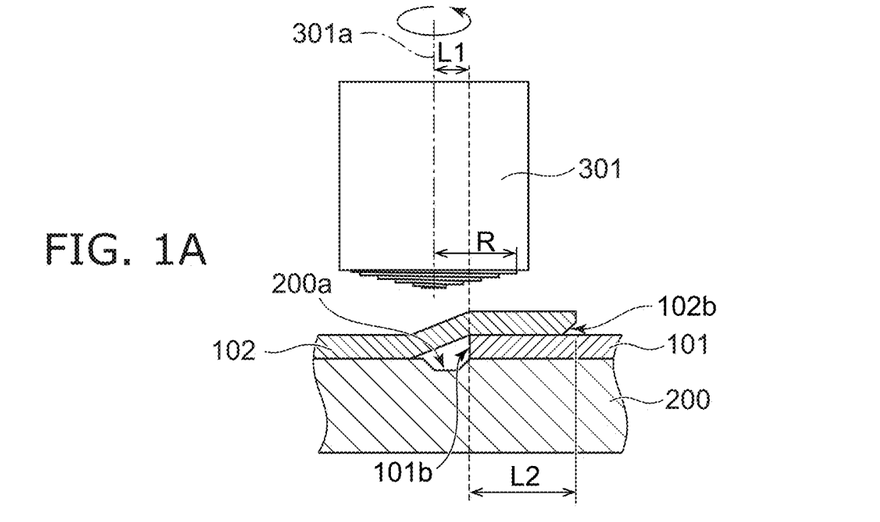
FIGS. 1A to 1C are schematic process cross-sectional views illustrating a method for joining dissimilar metals according to the embodiment.
Figure 1B:
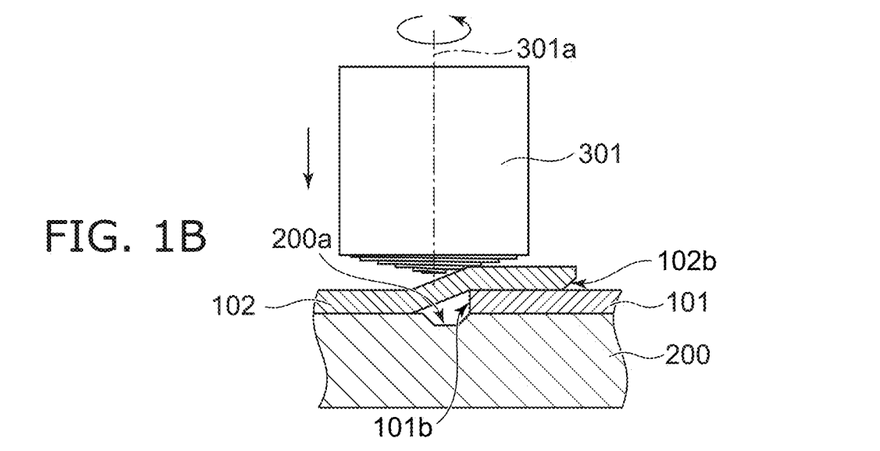
Figure 1C:
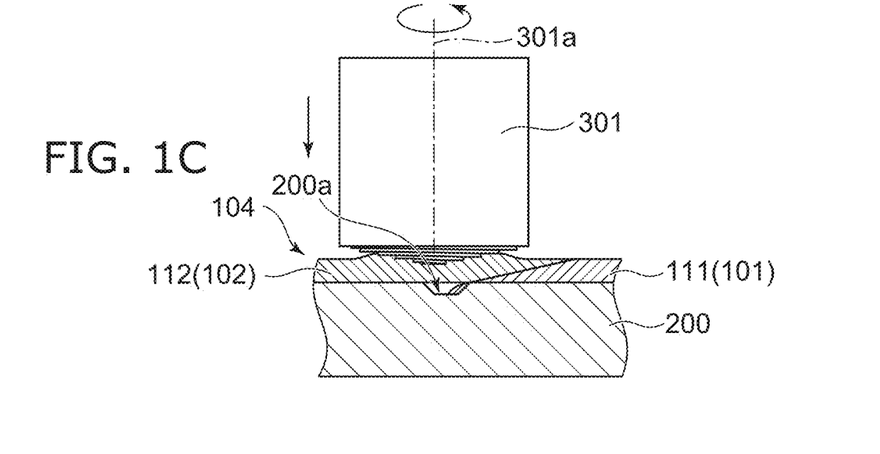

FIGS. 1A to 1C are schematic process cross-sectional views illustrating a method for joining dissimilar metals according to the embodiment.

First, as shown in FIG. 1A, a first member 101 and a second member 102 are placed on a backing plate 200. At this time, the vicinity of an end portion of the second member 102 is overlapped on the vicinity of an end portion of the first member 101.

The first member 101 and the second member 102 can be, for example, plate materials having a small thickness. A thickness of the first member 101 and a thickness of the second member 102 are not particularly limited. For example, these thicknesses can be 2 mm or less. The thickness of the second member 102 may be the same as or different from the thickness of the first member 101.

The first member 101 and the second member 102 are made of metal. In this case, the melting point of the metal of the second member 102 is higher than the melting point of the metal of the first member 101. A material of the first member 101 (corresponding to an example of the first metal) can be, for example, aluminum, an aluminum alloy, or the like. A material of the second member 102 (corresponding to an example of the second metal) can be, for example, copper, a copper alloy, or the like.

In a direction orthogonal to a central axis 301a of a joining tool 301 (hereinafter, simply referred to as a tool 301), a position of the central axis 301a of the tool 301 fits with a position of an end face 101b of the first member 101 or is a position set to move toward the second member 102. At this time, a distance L1 between the central axis 301a and the end face 101b of the first member 101 is set to be shorter than a radius R of the protruding portion at the tip end of the joining tool.

For example, when the thickness of the first member 101 and the thickness of the second member 102 are approximately 1 mm, a length (overlapping margin) L2 of the portion (overlapping portion) of the second member 102 overlapping the first member 101 can be approximately 0.5 mm to 3 mm. When L2 is in a range of "L2<R−L1", a notch is easily formed at a joining interface. In this case, when at least a lower side (the first member 101) of an end face of the second member 102 is a slope 102b or has a curved face shape, it is possible to prevent occurrence of the notch in the joining interface.

A diameter of a portion of the tool 301 to be in contact with the second member 102 can be approximately 6 mm to 8 mm.

An end portion of the tool 301 on the second member 102 side has a substantially truncated cone shape or a substantially conical shape. In addition, when viewed from a direction along the central axis 301a of the tool 301, the end portion of the tool 301 on the second member 102 side has a strip-shaped face that circles in a spiral shape around the central axis 301a or a strip-shaped groove that circles in a spiral shape around the central axis 301a.

Next, as shown in FIG. 1B, the rotating tool 301 is lowered from an upper side to a lower side to be pressed against the vicinity of the end portion of the second member 102. A rotation speed of the tool 301 can be, for example, approximately 4000 rpm or more. A moving speed of the tool 301 in the direction orthogonal to the central axis 301a of the tool 301 can be, for example, approximately 60 mm/min or more.

In addition, in the direction orthogonal to the central axis 301a of the tool 301, the central axis 301a of the tool 301 is positioned closer to the second member 102 than the end portion of the first member 101. That is, the central axis 301a of the tool 301 is made offset toward the second member 102 side. In such a manner, the portion of the second member 102 pressurized by the central portion of the joining tool 301 can be easily lowered, and the height difference between the bottom surface of the first member 101 and the bottom surface o the second member 102 after joining can be reduced. The central axis 301a of the tool 301 illustrated in FIGS. 1A and 1B is set at the position of the end portion of the first member 101.

Next, as shown in FIG. 1C, the rotating tool 301 is lowered toward the first member 101 side (the backing plate 200 side) to pressurize the portion where the second member 102 overlaps the first member 101. A height of a rotation center position of the tip end of the tool 301 is the same as that of an upper surface of the first member 101, or the rotation center position is set at a position on the second member 102 side by, for example, 0.1 mm from the upper surface of the first member 101. When the rotating tool 301 is pushed in, the frictional heat is generated between the rotating tool 301 and the second member 102. The end portion of the second member 102 is heated by the generated frictional heat, and a temperature of the end portion of the second member 102 increases. In addition, heat of the end portion of the second member 102 is transferred to the first member 101 in contact with the second member 102, and a temperature of the end portion of the first member 101 increases.

Here, similarly to the method for joining dissimilar metals according to the embodiment, in friction stir joining in which a temperature of a metal member increases due to the frictional heat generated by bringing the rotating joining tool into contact with the metal member, it is said that the temperature of the metal member in the vicinity of a portion in contact with the joining tool increases to approximately 70% to 80% of a melting point.

For example, when the second member 102 is made of copper and the first member 101 is made of aluminum, the melting point of copper is about 1085° C. In this case, it is considered that the temperature of the copper in the portion in contact with the tool 301 can be raised to approximately 760° C. to 870° C. by the rotating tool 301. Part of the heat generated in the second member 102 is transmitted to the portion of the first member 101 that contacts the second member 102. When the temperature of this contacting portion exceeds 548° C., the eutectic point of copper and aluminum, a eutectic reaction occurs. The eutectic reaction produces a melt containing a mixture of aluminum and copper. The melt also incorporates aluminum and copper oxides and contaminants. The melt is extruded to the upper surface side and the lower surface side of the joint surface by pressure from the tool 301. The volume of aluminum and copper respectively decreases due to the melt formation and extrusion from the joint surface, and the joint deforms from a lap shape to a butt shape. When using the tool 301 with a substantially truncated conical tip, the joint surface of copper and aluminum is deformed following the shape of the tip of the tool 301 so that the pressure on the joint surface becomes substantially uniform. As a result, a sloped joint surface is formed. Clean surface of aluminum and copper are exposed after the melt is extruded. When the clean surfaces come into contact with each other, a thin intermetallic compound layer is generated and the two are joined together. Further, the melt extruded to the lower surface side of the joint surface during the joining is accumulated in the recessed portion 200a provided in the backing plate 200. If the backing plate 200 is not provided with the recessed portion 200a, the melted portion of the first member 101 will enter between the second member 102 and the backing plate 200. Therefore, the second member 102 is lifted and the thickness of the second member 102 is greatly reduced. As the thickness of the second member decreases, the strength near the joint decreases and the electrical resistance increases.

Therefore, in the method for joining dissimilar metals according to the embodiment, a part of the material of the first member 101 discharged to the outside of the joining portion is stored in the recessed portion 200a provided on a surface of the backing plate 200. When the recessed portion 200a is provided, it is possible to prevent the material of the first member 101 from entering between the second member 102 and the backing plate 200, and thus it is possible to prevent a decrease in a thickness in the vicinity of the end portion of the second member 102.

For example, when the first member 101 is placed on the backing plate 200, an end of the recessed portion 200a is located at the same position as the end face of the first member 101, or is located closer to the second member 102 side than the position of the end face of the first member 101. When the recessed portion 200a is provided at such a position, it is possible to effectively prevent the material of the first member 101 from entering between the second member 102 and the backing plate 200.

By the method described above, the first member 101 and the second member 102 can be butt-joined to manufacture a joined body 104.

Although the material of the first member 101 discharged into the recessed portion 200a adheres to the manufactured joined body 104, the adhering material may be removed by machining or the like.

As described above, the method for joining dissimilar metals according to the embodiment is a method for buttjoining, using frictional heat, the first member 101 having a plate shape and containing the first metal and the second member 102 having a plate shape and containing the second metal having a melting point higher than that of the first metal.

The method for joining dissimilar metals can include processes as follows:
  overlapping the end portion of the second member 102 on the end portion of the first member 101; and
  pressurizing the second member 102 toward the first member 101 by bringing the rotating tool 301 having the protruding portion at the tip end into contact with the overlapping portion of the second member 102 with the first member 101.

When the second member 102 is pressurized toward the first member 101, the tip end of the rotating tool 301 is not brought into contact with the first member 101.

The method can further include moving the rotating tool 301, which pressurizes the second member 102 toward the first member 101, along the overlapping portion in a direction substantially parallel to the upper surface of the first member 101

When the rotating tool 301 is moved, the tip end of the rotating tool 301 is not brought into contact with the first member 101.

In overlapping the end portion of the second member 102 on the end portion of the first member 101, the first member 101 and the second member 102 are placed on the backing plate 200.

In pressurizing the second member 102 toward the first member 101 by bringing the rotating tool 301 into contact with the overlapping portion of the second member 102 with the first member 101, a melted alloy including the first metal discharged from the joining interface between the first member 101 and the second member 102 is discharged to the recessed portion 200a provided on the surface of the backing plate 200.

In the direction orthogonal to the central axis 301a of the tool 301, the central axis 301a of the tool 301 is located in the vicinity of the end face of the first member 101 or at a position spaced from the end face of the first member 101 toward the second member 102 side, and the distance L1 between the central axis 301a of the tool 301 and the end face of the first member 101 is shorter than the radius R of the protruding portion at the tip end of the tool 301.

Figure 2A:
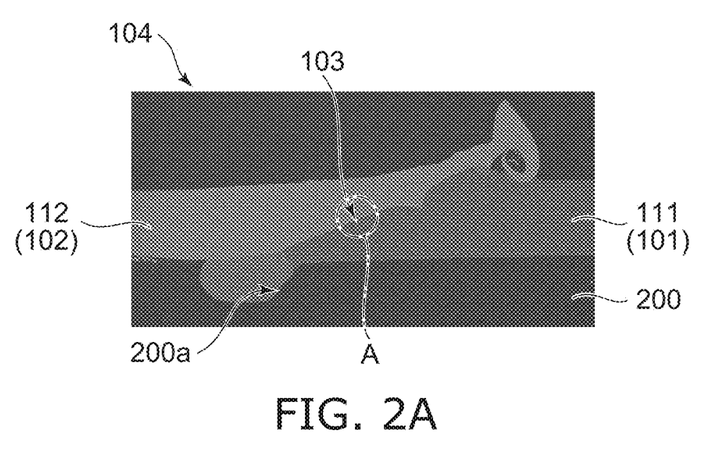
FIG. 2A is a microscope photograph of a cross section of a joining portion of a joined body when a first member is made of aluminum and a second member is made of copper.

FIG. 2A is a microscope photograph of a cross section of a joining portion of the joined body 104 when the first member 101 is made of aluminum and the second member 102 is made of copper.

Figure 2B:
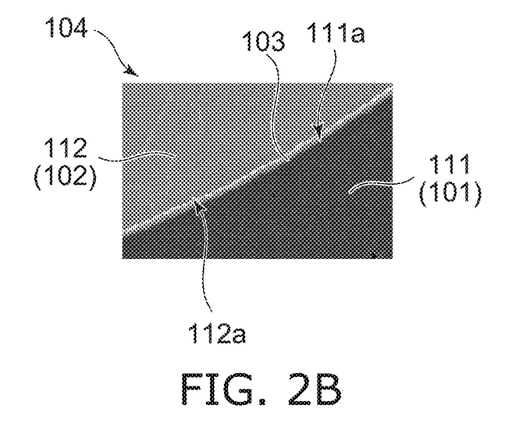
FIG. 2B is an enlarged photograph of a portion A in FIG. 2A.

FIG. 2B is an enlarged photograph of a portion A in FIG. 2A.

As described above, according to the method for joining dissimilar metals of the embodiment, the end portions of the first member 101 and the second member 102 are softened, and a part of the first member 101 and a part of the second member 102 are melted. By using the tool 301 having a truncated cone shape at the tip end, as shown in FIG. 2A, a region 111a of a first portion 111 (the first member 101) of the joined body 104 joined to a second portion 112 (the second member 102) is inclined with respect to a direction orthogonal to a thickness direction of the first portion 111. A region 112a of the second portion 112 joined to the first portion 111 is inclined with respect to a direction orthogonal to a thickness direction of the second portion 112. The first portion 111 (the first member 101) and the second portion 112 (the second member 102) are butt-joined by the region 111a and the region 112a inclined in opposite directions.

In general, when plate-shaped metal members are buttjoined to each other, end faces perpendicular to surfaces of the members are joined to each other. Therefore, when a strength of the joining interface is lower than that of an original member, it may be difficult to obtain a necessary strength of the joining portion. On the other hand, according to the method for joining dissimilar metals of the embodiment, since the inclined regions formed in the vicinity of the end portions of the members are joined to each other, a joining area can be increased as compared with a general joining method. Therefore, even when the strength per joining area is low, it is possible to obtain a sufficient strength of the joining portion.

For example, according to the method for joining dissimilar metals of the embodiment, a length of an inclined region can be set to approximately three times the thickness of the member. That is, the joining area can be made three times or more as compared with that in the general joining method.

In addition, when the metal members are butt-joined, a change in electrical resistance of the joining portion may become a problem. According to the general joining method, end faces perpendicular to the surfaces of the members are joined to each other, and thus the electrical resistance of the joining portion sharply changes. On the other hand, according to the method for joining dissimilar metals of the embodiment, the thickness of the member at the joining portion gradually changes. Therefore, it is possible to prevent a sharp change in the electrical resistance of the joining portion.

As shown in FIG. 2B, a film-like intermetallic compound layer 103 made of copper and aluminum having a thickness of 2 μm or less is formed at the joining interface. It is found by analysis that the intermetallic compound layer 103 contains not one type, but three types of CuAl and $CuAl_2$, for example. In joining of copper and aluminum, it is described in the following literatures that a joining strength sharply decreases when a thickness of the Cu—Al intermetallic compound layer generated at the joining interface exceeds about 4 μm.

"Wei Xie, Tomiko Yamaguchi, Kazumasa Nishio. Formation of Intermetallic Phases on the Bond Interface of Aluminum-Clad Copper. Journal of the Japan Institute of Metals and Materials. 2011, Vol.75, No.3, p.166."

The intermetallic compounds are likely to be thickly formed in welding, and welding is not used for joining copper and aluminum.

As shown in FIG. 2B, according to the method for joining dissimilar metals of the embodiment, the thickness of the intermetallic compound layer 103 can be 1 μm or less. In addition, the joining area can be three times or more of an end area of a plate-shaped member to be joined. Therefore, even if a layer containing the intermetallic compounds is formed, a sufficient joining strength can be obtained.

That is, the joined body 104 according to the embodiment includes: the first portion 111 having a plate shape and containing the first metal; the second portion 112 having a plate shape and containing the second metal having a melting point higher than that of the first metal, the second portion 112 being joined to one end portion side of the first portion; and the intermetallic compound layer 103 containing intermetallic compounds including an element of the first metal and an element of the second metal, the intermetallic compound layer 103 being provided between the region 111a of the first portion 111 joined to the second portion 112 and the region 112a of the second portion 112 joined to the first portion 111. The region 111a of the first portion 111 joined to the second portion 112 is inclined with respect to the direction orthogonal to the thickness direction of the first portion 111. The region 112a of the second portion 112 joined to the first portion 111 is inclined with respect to the direction orthogonal to the thickness direction of the second portion 112.

The thickness of the intermetallic compound layer 103 is 2 μm or less.

(Joining Apparatus)

Next, a joining apparatus 300 according to the embodiment will be illustrated.

The joining apparatus 300 butt-joins, using frictional heat, the first member 101 having a plate shape and containing the first metal and the second member 102 having a plate shape and containing the second metal having a melting point higher than that of the first metal.

Figure 3:
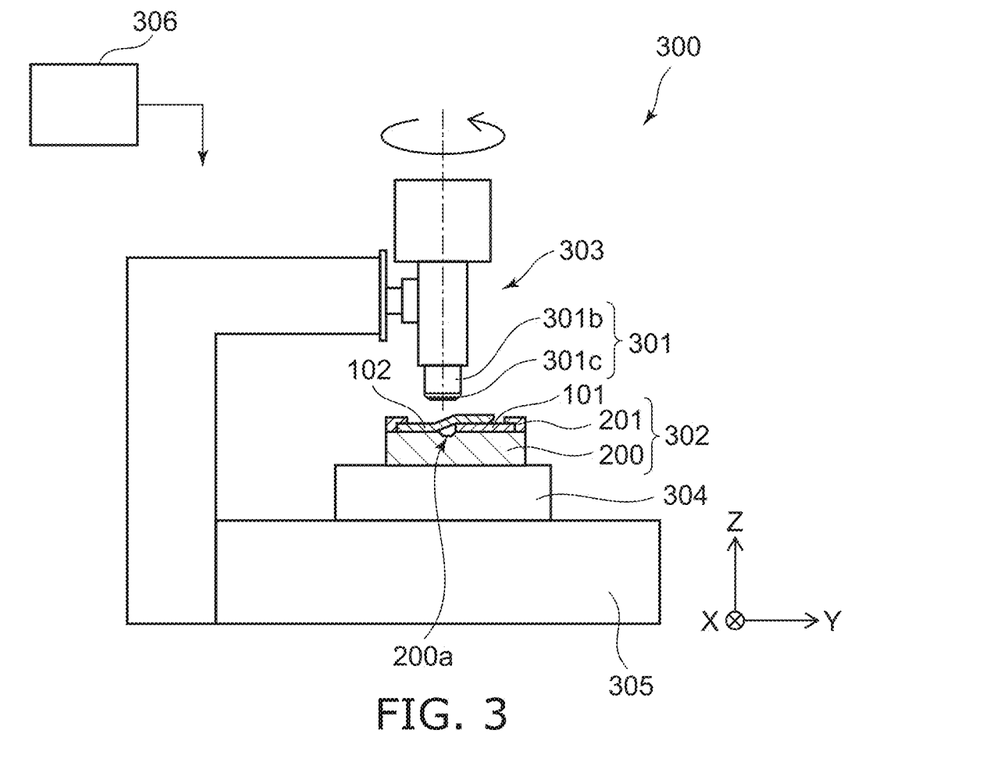
FIG. 3 is a schematic view illustrating a joining apparatus according to the embodiment.

FIG. 3 is a schematic view illustrating the joining apparatus 300 according to the embodiment.

Arrows X, Y, and Z in FIG. 3 indicate three directions orthogonal to one another. For example, the arrow Z indicates a vertically upward direction, and the arrow X and the arrow Y indicate horizontal directions.

Figure 4:
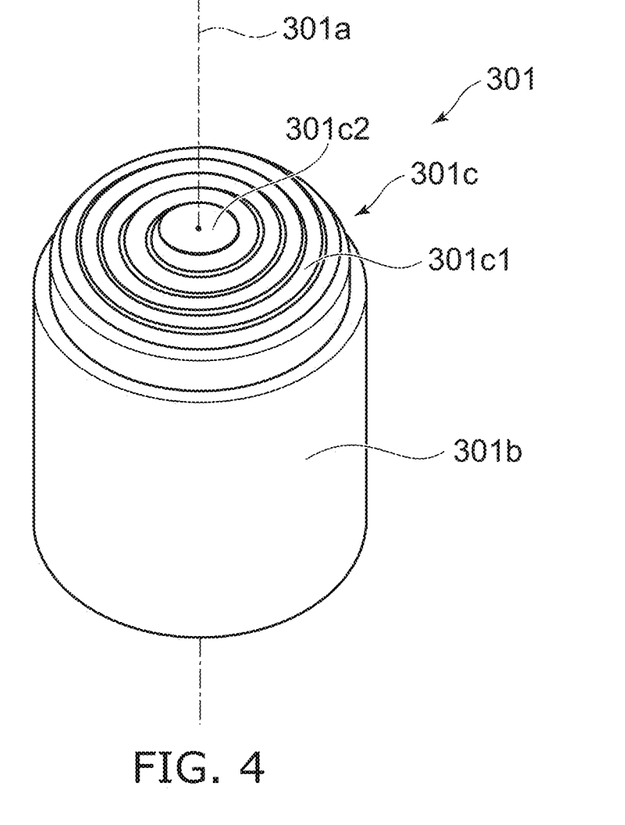
FIG. 4 is a schematic perspective view illustrating a tool.

FIG. 4 is a schematic perspective view illustrating the tool 301.

As shown in FIG. 3, the joining apparatus 300 is provided with, for example, the tool 301, a stage 302, a processing unit 303, a moving unit 304, a stand 305, and a control device 306.

As shown in FIG. 4, the tool 301 includes a base portion 301b and a protruding portion 301c. The base portion 301b and the protruding portion 301c are integrally formed. For example, the protruding portion 301c can be formed by processing one end portion of the base portion 301b having a columnar shape.

Materials of the base portion 301b and the protruding portion 301c are not particularly limited, and a material that is harder than the first member 101 and the second member 102 to be joined is used. The material of the base portion 301b and the protruding portion 301c can be, for example, tool steel, a tungsten alloy, ceramics, or the like.

The protruding portion 301c is provided at one end portion of the base portion 301b having a columnar shape.

The protruding portion 301c can have a substantially truncated cone shape or a substantially conical shape.

In this case, as shown in FIG. 4, a strip-shaped face 301c1 that circles in a spiral shape or a strip-shaped groove that circles in a spiral shape can also be provided on a side surface of the protruding portion 301c.

For example, when viewed from the direction along the central axis 301a, the strip-shaped face 301c1 is provided on a surface of the protruding portion 301c. When viewed from the direction along the central axis 301a, the strip-shaped face 301c1 is wound in a spiral shape around the central axis 301a, and is separated from the central axis 301a as the strip-shaped face 301c1 circles around the central axis 301a. In this case, the spiral direction is opposite to a rotation direction of the tool 301.

When viewed from the direction along the central axis 301a, the strip-shaped face 301c1 and the contiguous strip-shaped face 301c1 are in contact with each other. The strip-shaped face 301c1 can also be a flat face, or a groove can also be provided in the strip-shaped face 301c1.

That is, when viewed from the direction along the central axis 301a of the tool 301, the end portion of the tool 301 on the second member 102 side includes the strip-shaped face 301c1 that circles in a spiral shape around the central axis 301a or the strip-shaped groove that circles in a spiral shape around the central axis 301a.

In addition, a position of the strip-shaped face 301c1 in the direction of the central axis 301a is separated from an end portion of the base portion 301b as the strip-shaped face 301c1 circles around the central axis 301a. That is, one end portion of the strip-shaped face 301c1 is connected to the end portion of the base portion 301b. The other end portion of the strip-shaped face 301c1 is connected to a top surface 301c2 of the protruding portion 301c opposite to the base portion 301b side. As the strip-shaped face 301c1 circles around the central axis 301a, the strip-shaped face 301c1 moves toward the top surface 301c2 of the protruding portion 301c so as to be separated from the end portion of the base portion 301b in the direction of the central axis 301a. That is, the strip-shaped face 301c1 is a continuous slope that circles in a spiral shape around the central axis 301a. For example, the strip-shaped face 301c1 can be an Archimedes spiral that circles around the central axis 301a.

When the tool 301 having such a spiral face 301c1 or a groove provided in the face 301c1 is rotated in a direction opposite to the spiral direction and pressed against the second member 102, the softened material of the second member 102 is drawn toward a center of the tool 301. Therefore, it is possible to prevent occurrence of defects such as voids in the joining portion.

The stage 302 includes the backing plate 200 and a holding unit 201.

The first member 101 and the second member 102 are placed on the backing plate 200 in a state where the vicinity of the end portion of the second member 102 is overlapped on the vicinity of the end portion of the first member 101. The backing plate 200 can be, for example, a metal plate. For example, the backing plate 200 is formed of tool steel, carbon steel, or the like. A material of the backing plate 200 is not limited to the illustrated ones.

The backing plate 200 includes a recessed portion 200a capable of accommodating a part of a flowing material of the first member 101. The recessed portion 200a is provided on the surface of the backing plate 200.

The holding unit 201 is provided, for example, on the surface of the backing plate 200. The holding unit 201 holds the first member 101 and the second member 102 placed on the surface of the backing plate 200. The holding unit 201 can be, for example, a holding claw or the like.

The processing unit 303 holds the tool 301. The processing unit 303 rotates the tool 301. In addition, the processing unit 303 changes a position of the rotating tool 301. For example, the processing unit 303 changes the position of the rotating tool 301 in the Z direction to bring the protruding portion 301c of the tool 301 into contact with the second member 102. The processing unit 303 includes, for example, a control motor such as a servo motor.

That is, the processing unit 303 presses the rotating tool 301 against the portion of the second member 102 that overlaps the first member 101.

The stage 302 is mounted on the moving unit 304. The moving unit 304 changes a position of the stage 302 in the X direction. The moving unit 304 may change the position of the stage 302 in the X direction and the Y direction. The moving unit 304 is, for example, a uniaxial table, a biaxial table (XY table), or the like.

The processing unit 303 and the moving unit 304 are mounted on the stand 305. For example, the processing unit 303 is mounted above the moving unit 304.

The control device 306 includes, for example, a calculation unit such as a central processing unit (CPU) and a storage unit such as a memory. The control device 306 is, for example, a computer. The control device 306 controls operations of elements provided in the joining apparatus 300 based on a control program stored in the storage unit.

For example, the control device 306 controls the operations of the elements provided in the joining apparatus 300, executes the method for joining dissimilar metals as described above, and butt-joins the first member 101 and the second member 102 to manufacture the joined body 104.

Further, the first member 101 is made of aluminum and the second member 102 is made of copper as in the embodiment, but if a temperature of 2/3 of the melting point of the second member 102 is higher than the melting point of the first member 101 or is higher than the eutectic point of the first member 101 and the second member 102, the same joining can also be implemented by other metals. Examples thereof include a combination in which the first member 101 is made of magnesium and the second member 102 is made of aluminum, a combination in which the first member 101 is made of silver and the second member 102 is made of copper, and a combination in which the first member 101 is made of aluminum and the second member 102 is made of steel.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Moreover, above-mentioned embodiments can be combined mutually and can be carried out.

What is claimed is:

1. A method for joining dissimilar metals in which a first member having a plate shape and containing first metal is butt-joined to a second member having a plate shape and containing second metal having a melting point higher than that of the first metal using frictional heat, the method comprising:
    overlapping an end portion of the second member on an end portion of the first member; and
    pressurizing the second member toward the first member by bringing a rotating joining tool having a protruding portion at a tip end into contact with an overlapping portion of the second member with the first member,
    when the second member is pressurized toward the first member, the tip end of the rotating joining tool being not in contact with the first member,
    wherein:
        in overlapping the end portion of the second member on the end portion of the first member, the first member and the second member are placed on a backing, and
        in pressurizing the second member toward the first member by bringing the rotating joining tool into contact with the overlapping portion of the second member with the first member, a part of the first metal discharged from a joining face between the first member and the second member is discharged to a recessed portion provided on a surface of the backing.

2. The method according to claim 1, further comprising: moving the rotating joining tool, which pressurizes the second member toward the first member, along the overlapping portion in a direction substantially parallel to an upper surface of the first member,
    when the rotating joining tool is moved, the tip end of the rotating joining tool being not in contact with the first member.

3. The method according to claim 1, wherein
    in a direction orthogonal to a central axis of the joining tool, the central axis of the joining tool is located in the vicinity of an end face of the first member or at a position spaced from the end face of the first member toward the second member side, and a distance between the central axis of the joining tool and the end face of the first member is shorter than a radius of the protruding portion at the tip end of the joining tool.

4. The method according to claim 1, wherein
    an end face or a part of the end face of the second member is a slope or a curved face.

5. The method according to claim 1, wherein
an end portion of the joining tool on the second member side has a substantially truncated cone shape or a substantially conical shape.

6. The method according to claim 1, wherein
when the joining tool is viewed from a direction along a central axis of the joining tool, an end portion of the joining tool on the second member side has a strip-shaped face configured to circle in a spiral shape around the central axis or a strip-shaped groove configured to circle in a spiral shape around the central axis.

7. The method according to claim 1, wherein
a thickness of the first member and a thickness of the second member are 2 mm or less.

8. The method according to claim 1, wherein
a length of the overlapping portion is 50% or more of the thickness of the second member.

9. The method according to claim 1, wherein the maximum width of a portion of the joining tool to come into contact with the second member is 100% or more of the thickness of the second member.

10. The method according to claim 1, wherein
a rotation speed of the joining tool is 4000 rpm or more.

11. The method according to claim 2, wherein
a moving speed of the joining tool is 60 mm/min or more.

12. The method according to claim 1, wherein
an end of the recessed portion is located at the same position as an end face of the first member or located closer to the second member side than a position of the end face of the first member.

13. The method according to claim 1, wherein
the first metal is aluminum, the second metal is copper.

14. The method according to claim 1, wherein
the first metal is magnesium, the second metal is aluminum.

15. The method according to claim 1, wherein
the first metal is silver, the second metal is copper.

16. The method according to claim 1, wherein
the first metal is aluminum, the second metal is steel.

* * * * *